Oct. 22, 1957 J. T. HOWES 2,810,845

ELECTRIC MOTOR STATOR

Original Filed Dec. 3, 1952

INVENTOR.
JOHN T. HOWES
BY
Martin J. Finnegan
ATTORNEY shape # United States Patent Office 2,810,845
Patented Oct. 22, 1957

2,810,845

ELECTRIC MOTOR STATOR

John T. Howes, Owosso, Mich., assignor to Redmond Company, Inc., Owosso, Mich., a corporation of Michigan Continuation of application Serial No. 323,847, December 3, 1952. This application October 16, 1953, Serial No. 386,503

6 Claims. (Cl. 310—172)

The present invention relates to electric motor stators, and in particular to those of the shaded pole type.

This application is a continuation of my application Ser. No. 323,847 filed December 3, 1952, and entitled "Shaded Pole Induction Motor," now abandoned.

In shaded pole motors as heretofore constructed the stator poles have, in general, been so formed as to provide maximum length along the pole faces, and a minimum of air gap peripherally, that is, between the leading pole tip of one pole and the trailing pole tip of the adjacent pole, this having been considered necessary to secure maximum magnetic material to accommodate the lines of force generated by the inter-action of the rotor and stator fields. In fact, even with the pole tips drawn toward each other as closely as possible, motor designers have heretofore considered it necessary, in many cases, to provide additional magnetic material in the form of "magnetic wedges," so called, adjacent the peripheral gap between successive poles. The drawing of the pole tips to their maximum extent, peripherally, has usually resulted in a pole shape in which the tips have tapered down to an extremely fine, narrow contour, necessitated in many cases by problems connected with space requirements for the field coil winding operations. These narrow, finely drawn pole tips have been a source of difficulty, one objection being the tendency to promote excessive vibrations, and another being the greater expense of preparing and maintaining lamination punching dies incorporating the narrow, tapering contours required for such tips. The objectionable narrowness of the tip contours has been further aggravated, in some designs, by the removal of much of the adjacent material in the process of providing the desired shading ring slots and reluctance "notches" or recesses. Moreover, the addition of magnetic wedges, to bridge the pole tips at their very narrow apices, has resulted in serious assembly problems, added manufacturing costs, and non-uniformity in torque output, as between successive motors, or even successive poles of the same motor, due to the impossibility of achieving uniform "snugness" in installing such wedges. In addition, the tendency toward looseness on the part of these wedges will result in an undesirable buzzing noise when the motor is operated. The use of wedges has the further drawback that it increases the possibility of electrical short circuiting from one pole piece to the other, thus giving rise to excessive eddy current losses, especially in the vicinity of the shading coil.

The present invention provides the means for substantially eliminating the problems pointed out above, and in particular for facilitating the coil winding problem and eliminating the necessity for use of magnetic wedges, but without sacrifice in the operating characteristics of the motor. The present invention is based upon the concept that an equal, or possibly even greater, magnetic efficiency can be attained by departing entirely from the prior art practice of using a tapered pole tip in motors of this type, and in utilizing instead a snub-nosed pole tip the thickness of which, measured radially of the stator, is at least as great as the width of the gap between adjacent pole tips, and which width can, from a practical point of view, be as great as twice the length of the gap between adjacent pole tips. This increased radial thickness of the opposed pole tips, or, in other words, the great increase in area of the facing tip surfaces, provides for the bridging of the gap by a sufficient number of magnetic lines of force to overcome the low density of such lines of force within the gap by reason of the length of the gap, in this way compensating for the gap length and producing optimum magnetic interaction between adjacent pole pieces. The use of such an arrangement has many advantages, among which are the following: First, it makes it possible to avoid extreme closeness, or adjacency, as between the edges of the successive tips thereby permitting the introduction (between the tips) of winding tools that lend themselves to faster and simpler winding procedures, many of which tools could not be employed in prior machines because of the lack of sufficient clearance between poles; secondly, there is an economy effected by reason of the greater simplicity of the lamination dies, due to the increased amount of material provided radially of the pole tips; thirdly, the resultant greater radial depth of the pole tip, throughout the region lying beyond the point of application of the shading ring, makes it possible to provide a recess directly opposite the conventional shading ring slot, of exactly the proper dimensions to completely accommodate the side of the shading ring, and thereby remove the hazard of damage to the field coil envelopes, such as has existed heretofore because of the rubbing of the soft envelopes against the sharp edge of the shading ring, and the possible grounding of the coil windings in consequence of such rubbing; and fourthly, the increased amount of material at the pole tips eliminates all need for magnetic wedges, and thus eliminates all of the constructional and operational disadvantages inherent in the use of wedges.

The accompanying drawings show the invention embodied in a stator assembly, having six poles disposed symmetrically and concentrically about the axis of the enclosed rotor (not shown) but it is of course obvious that the invention can be applied to stator assemblies of different numbers of either symmetric or asymmetric poles, and whether concentrically or eccentrically disposed. In the following drawings.

Figure 1:
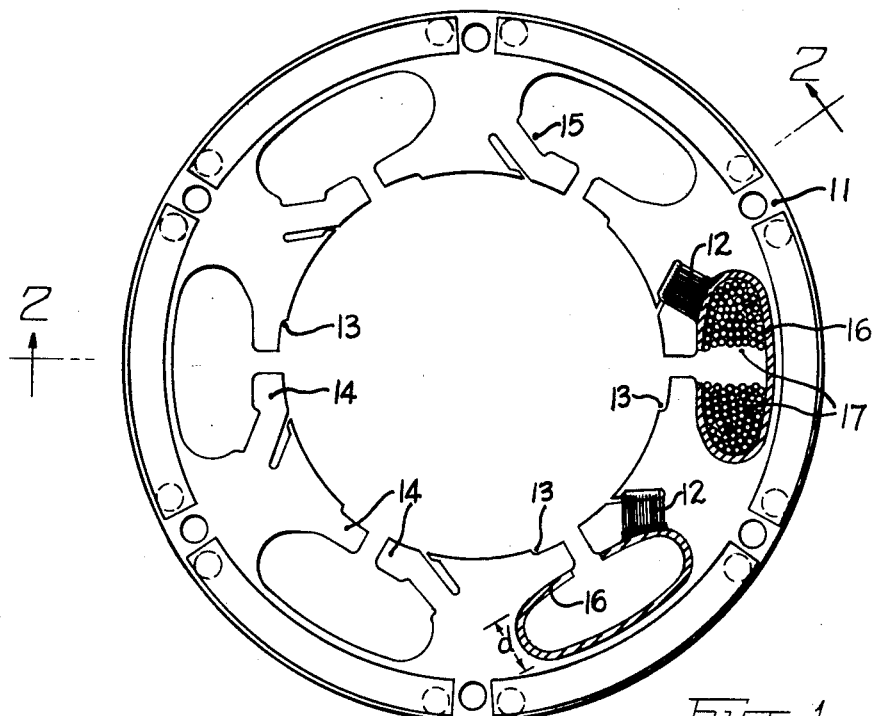
Fig. 1 is an end view of a stator assembly embodying the invention.
Figure 2:
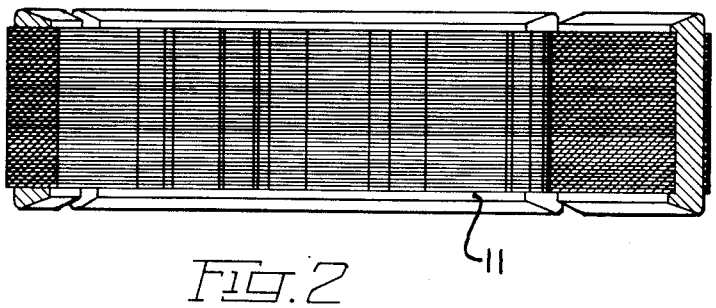
Fig. 2 is a transverse sectional view along line 2—2 of Fig. 1.

The individual laminae which make up the stator assembly are contoured to form six poles symmetrically arranged about the center of the outer circular periphery 11; each pole being slotted near one end of its facial extent to provide for installation of the conventional shading ring (see rings 12, Figure 1) and recessed at the opposite end 13, of its face to provide a reluctance gap, as in Ballentine Patent Number 2,591,117, granted April 1, 1952; but in lieu of the nearly touching, long-tapering narrow tips of the prior art shaded poles, I provide snub-nosed tips of relatively great radial depth and approximately square contour and preferably having substantially planar facing surfaces substantially perpendicular to the length of the gap therebetween, and which may be spaced apart to a much greater degree than are the tapering tips of the prior art. These squaroid tips are of equal thickness except for the difference represented by the depth of reluctance recesses, 13 (which recesses may be omitted, if not desired), and immediately behind alternate squaroid tips, and in alignment with the shading ring slots, I provide rectangular recesses, 15, of sufficient depth to permit reception of the shading rings in "flush" fashion, as indicated at 12 in Figure 1, thereby eliminating the possibility of corner contact with the surface of the coil envelopes 16 (Figure 1) which provide the insulating barrier between each shading ring and its associated field coil 17.

It has been found that magnetic interaction between adjacent pole pieces of desired character may be attained when the thickness of the snub-nosed tips is at least as great as the length of the gap therebetween. In most instances a practical upper limit on the thickness of these tips may be set at twice the length of the gap, since excessive leakage flux from one pole to another will result in a loss of efficiency. Another factor limiting the maximum thickness of the pole tips is the space that must be provided for the reception of the coils wound around the pole pieces. In a ⅛ H. P. induction motor commercially sold on an appreciable scale by the assignee of the instant invention, best operating results have been obtained when the thickness of the facing tips was approximately 1½ times the length of the gap, the thickness being .245 inch and the gap .150 inch.

To indicate the operating advantages inherent in the practice of the present invention, the above mentioned ⅛ H. P. motor was modified so as to reduce the thickness of the facing pole tips to approximately half the length of the gap therebetween (.062 inch), and comparative tests were made with the motor designed according to the present invention. At rated output the efficiency of the motor made according to the present invention was 35.2%, that motor drawing 3.90 amps. and 264 watts. The motor modified so as to narrow its pole tips and thus make it conform more closely to the prior art had an efficiency of 33.3%, and drew 4.10 amps. and 278 watts. The design of the stator poles according to the present invention therefore had the effect of producing an efficiency improvement which was 6% of the efficiency of the motor which corresponded to the prior art. In another test, the two motors under discussion were connected to fans and permitted to operate until the temperature of the motors reached an equilibrium position. The temperature of the motor made according to the present invention rose 43.0° C. The temperature of the other motor rose 48.5° C. In order to further indicate the advantages of the present invention, the speed of operation of the two motors was measured with different voltages applied thereto, the motors being rated at 115 volts. Above 90 volts the speed of the two motors were substantially the same. Between 90 and 70 volts, the graph of the speed of the motors made according to the present invention was a substantially straight line inclined downwardly. By way of contrast, the graph of the speed of the motor made in accordance with the teachings of the prior art was definitely non-linear, the latter motor having a speed greater than that of the motor of the present invention at voltages between 78 and 90 and having a lower speed at voltages below 78 volts. Thus it will be seen that by utilizing the present invention a more efficient motor is produced, one which draws less current and which is subject to less of a temperature rise, and one in which the voltage-speed relationship is much more desirable, than is the case with a motor identical in all other respects but having pole tips the depth of which is less than the length of the gap between those tips.

The increased size of the peripheral gaps between successive pole tips makes it possible to employ, in the coil winding procedure, winding needles or other tools of more sturdy construction and yet capable of moving in and out of the polar cavities by way of these enlarged peripheral gaps. Such winding tools simplify the coil winding operation, but with prior stator constructions the use of winding tools of adequately sturdy construction was not possible because of the lack of a pole tip gap of sufficient width to receive a really sturdy tool.

The effect of this construction on the use of shading coils and the location of those shading coils is significant. It is in many instances preferred that the shading coils be located on the flaring portions of the pole pieces. Because of the small amount of material in those pole piece portions insofar as the prior art is concerned, no provision for housing those parts of the shading coil which extend around the inner surface of the pole piece could be provided. Hence such shading coils always encroached upon the space provided for the energizing coils wound about the individual pole pieces, tended to cut into the sheet of insulating material which separated the shading coils from the energizing coils, and thus provided a fruitful source of groundings or short circuitings. These disadvantages, although real and well recognized, were nevertheless accepted because of the desirability of positioning the shading coils as described, instead of positioning them within the wide and comparatively massive base portion of the pole piece, where sufficient material would be available for recessing the shading coil. A particular advantage of the instant construction when employed in shaded pole motors is that sufficient material is provided at the flaring pole piece tips to permit the formation of the recesses 15 within which the shading coils may be housed. It will be noted that the slots in the pole pieces extend outwardly from the pole faces substantially parallel to the radial inner surface of the flaring portion of the pole piece, thus producing an auxiliary pole piece section around which the shading coil 12 is wound which is a part of the flaring pole face portion of the pole piece and which is not a part of the radially extending base portion thereof.

The magnetic area eliminated by the reduction in the peripheral extent of the pole faces is adequately compensated for by the performance and structural gains resulting from the increased radial depth ("thickness") of the pole tips. At the same time the usable space remaining for reception of the field windings is approximately the same as in prior constructions, particularly as the shading rings 12 are completely "inlaid," hence do not encroach upon the winding area. In other words, the dimension "d" of each coil is substantially the same as in prior constructions of comparable specifications.

While but a single embodiment of the present invention has been here described, it will be apparent that many variations may be made in the details thereof without departing from the present invention as defined in the following claims.

I claim:

1. In an electric motor stator comprising a ring of magnetizable material with pole pieces extending radially inwardly therefrom and terminating in pole faces the tips of which extend toward the tips of adjacent pole faces and are separated therefrom by a gap, and in which coils are adapted to be wound about said pole pieces via said gaps and to be received within spaces between said pole pieces, the length of said gaps therefore being sufficient to permit the coil winding instrumentality to pass therethrough, the improvement which comprises said pole tips being essentially thick and blunt having a thickness at least equal to the length of the gaps between adjacent tips and greater than one quarter of the depth of the spaces between said pole pieces within which said coils are adapted to be received.

2. In an electric motor stator comprising a ring of magnetizable material with pole pieces extending radially inwardly therefrom and terminating in pole faces the tips of which extend toward the tips of adjacent pole faces and are separated therefrom by a gap, and in which coils are adapted to be wound about said pole pieces via said gaps and to be received within spaces between said pole pieces, the length of said gaps therefore being sufficient to permit the coil winding instrumentality to pass therethrough, the improvement which comprises said pole tips being essentially thick and blunt having a thickness greater than the length of the gaps between adjacent tips but no greater than twice that length and greater than one quarter of the depth of the spaces between said pole pieces within which said coils are adapted to be received.

3. In an electric motor stator comprising a ring of magnetizable material with pole pieces extending radially inwardly therefrom and terminating in pole faces the tips of which extend toward the tips of adjacent pole faces and are separated therefrom by a gap, and in which coils are adapted to be wound about said pole pieces via said gaps and to be received within spaces between said pole pieces, the length of said gaps therefore being sufficient to permit the coil winding instrumentality to pass therethrough, the improvement which comprises said pole tips being essentially thick and blunt having a thickness approximately 1½ times the length of the gaps between adjacent tips and greater than one quarter of the depth of the spaces between said pole pieces within which said coils are adapted to be received.

4. The electric motor stator of claim 1, in which the surfaces of said tips are substantially planar and substantially perpendicular to the length of their respective gaps.

5. The electric motor stator of claim 2, in which the surfaces of said tips are substantially planar and substantially perpendicular to the length of their respective gaps.

6. The electric motor stator of claim 3, in which the surfaces of said tips are substantially planar and substantially perpendicular to the length of their respective gaps.

References Cited in the file of this patent

UNITED STATES PATENTS

| | | |
|---|---|---|
| 1,750,240 | Myer | Mar. 11, 1930 |
| 1,750,745 | Conley | Mar. 18, 1930 |
| 1,823,979 | Jordan | Sept. 22, 1931 |
| 1,934,981 | Johnson | Nov. 14, 1933 |
| 1,952,220 | Price | Mar. 27, 1934 |
| 2,047,487 | O'Leary | July 14, 1936 |
| 2,071,224 | Ballentine | Feb. 16, 1937 |
| 2,355,175 | Olving | Aug. 8, 1944 |
| 2,591,117 | Ballentine | Apr. 1, 1952 |

FOREIGN PATENTS

| | | |
|---|---|---|
| 515,129 | Germany | Dec. 22, 1930 |